Figure 1:
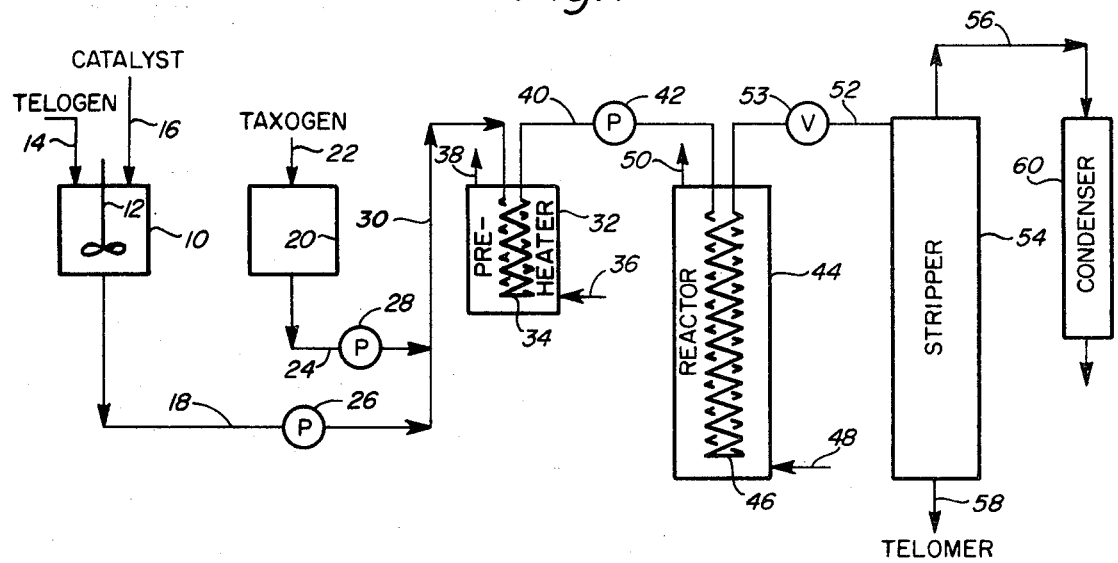

United States Patent
Blades

[11] 3,742,037
[45] June 26, 1973

[54] TELOMERS OF VINYL ALKANOATES AND A METHYL SUBSTITUTED BENZENE COMPOUND

[75] Inventor: Charles E. Blades, Spring Row, N.J.

[73] Assignee: Air Products and Chemicals, Inc., Allentown, Pa.

[22] Filed: July 31, 1970

[21] Appl. No.: 64,934

[52] U.S. Cl. ....... 260/488 CD, 106/38.23, 106/180, 204/158 HE, 260/491
[51] Int. Cl. ....................... C07c 69/20, C07c 69/32
[58] Field of Search ............................. 260/488 CD

[56] References Cited
UNITED STATES PATENTS 2,834,747  5/1958  Short et al. ......................... 260/488
3,290,538  12/1966  Pallitzer ............................. 260/488

*Primary Examiner*—Lorraine A. Weinberger
*Assistant Examiner*—Vivian Garner
*Attorney*—B. Max Klevit, Barry Moyerman and David T. Nikaido

[57] ABSTRACT

A telomer of a vinyl ester and a benzene containing at least two methyl groups has utility as a plasticizer for nitrocellulose; the telomer is suitably produced by reacting the vinyl ester with the substituted benzene in the presence of a free radical catalyst.

3 Claims, 3 Drawing Figures

TELOMERS OF VINYL ALKANOATES AND A METHYL SUBSTITUTED BENZENE COMPOUND

CROSS REFERENCE FOR RELATED APPLICATION

This is a Division of copending application Ser. No. 694,574, filed Dec. 29, 1967, for "TELOMER AND PLASTICIZED COMPOSITION FORMED THEREFROM."

This invention relates to vinyl acetate telomers and is more particularly concerned with vinyl acetate telomers which are useful in the preparation of nitrocellulose compositions.

In the formulation of cellulose nitrate to form cellulose nitrate compositions suitable for making sheets or molded products of various kinds, or to make coatings, it is customary to compound the cellulose nitrate with a plasticizer, and sometimes with solvents such as ethyl alcohol, butyl acetate, ethylene propionate, and the like. Numerous plasticizers for cellulose nitrate have been proposed, and these plasticizers have varying plasticizing action upon this polymer. A problem encountered in the plasticizing of cellulose nitrate, however, is that many plasticizers have a tendency to increase the water sensitivity of the plasticized cellulose nitrate composition. In many cases, and especially when the plasticized cellulose nitrate is to be used for certain purposes, this increase in water sensitivity cannot be tolerated.

It is accordingly an object of this invention to provide a composition of matter which is particularly useful and effective as a plasticizer for cellulose nitrate.

It is a further object of the invention to provide a composition of matter of the character indicated which not only is an effective plasticizer for cellulose nitrate, but which does not increase the water sensitivity of cellulose nitrate which compounded therewith.

In accordance with the invention, there is provided a telomer of a vinyl ester, particularly a lower-alkyl vinyl ester such as vinyl acetate, with a methyl-substituted benzene containing at least two methyl substituents, such as xylene, mesitylene, and the like.

Telomers are the products of the so-called telomerization reaction wherein a telomerizable unsaturated compound, designated as the "taxogen", is reacted under telomerization conditions in the presence of radical-forming catalysts or initiators, with a so-called "telogen." During the reaction, the telogen is split into radicals which attach to the ends of the telomerizing taxogen and, in some cases, add to the double bond of the taxogen and form chains with terminal groups composed of the radicals formed from the telogen. Telomerization is discussed, for example, in Hanford et al U.S. Pat. No. 2,418,832 of Apr. 15, 1947. Thus, if the telogen is represented as YZ, telomers can be represented as Y(A)$_n$Z, wherein (A)$_n$ is a divalent radical formed by condensation of the taxogen, n being any integer, and Y and Z being fragments of the telogen attached to the terminal portions of the radical (A)$_n$.

Telomers are different from copolymers and/or interpolymers. Copolymers and/or interpolymers contain a number of each of two or more different monomer units in the main polymer chain, whereas the fragments of another molecule (the telogen) in telomers appear as units at the terminals of the main telomer chain. The telomerization reaction proceeds in the presence of a free-radical initiator which removes an active hydrogen from the telogen. The resulting radical initiates the telomerization by adding to the double bond of the taxogen.

In accordance with the invention, there is provided a telomer of the formula

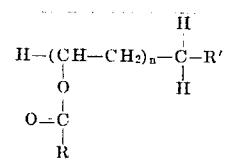

wherein R is an alkyl group, especially a lower-alkyl group, e.g. having up to six carbon atoms, and R' is a methyl-substituted phenyl group containing at least one methyl group attached to it, and having only methyl substituents. To prepare these telomers, a vinyl ester of the formula RCOOCH—H$_2$, is telomerized by heating it at an elevated temperature of 90° to 250°C. at a pressure of 50 to 7500 p.s.i.g., in the presence of a radical-forming catalyst or initiator and in the presence of a telogen which is a methyl-substituted benzene having at least two methyl groups attached to the phenyl group. In a particularly advantageous process the telomerization is carried out under the foregoing conditions of temperature and pressure by continuously passing the vinyl ester, telogen, and catalyst mixture through a telomerization zone wherein the telomerization mixture has a residence time of 0.5 min. to 60 min., preferably 1 min. to 10 min. The pressure in the telomerization zone is maintained at a value within the foregoing range such that the vinyl ester monomer, and the telogen, are continuously in the liquid phase. Advantageously, although not necessarily, the reaction mixture is preheated before introduction into the reaction zone to bring it to within about 20° to 50°C. of the intended reaction temperature and the residence time in the preheating zone is just sufficient to accomplish the desired preheating. Suitably employed is the process defined in copending application of Joseph K. Hoffman and James P. Russell, Ser. No. 386,593, filed July 31, 1964 for TELOMERS.

The ratio between the telogen and the vinyl ester can vary, but the telogen is always present in an amount of at least 10 percent by weight of the vinyl ester, and preferably at least 30 percent by weight, and a practical upper limit on the amount of telogen is 90 percent by weight of the vinyl ester.

Telomers of this invention can be produced which have low viscosity and high solvating and plasticizing properties so that they form more fluid bodies at lower temperatures than is possible with the homopolymer or copolymers formed from the vinyl ester alone in the absence of the telogen. As a result, the telomers of this invention are particularly suitable for use as plasticizers, particularly for cellulose nitrate, because they do not have to be heated in order to place them in a sufficiently fluid condition for use. The preferred telomer of this invention is a vinyl acetate-xylene telomer which is a particularly clear product and, by varying the ratio of xylene to vinyl acetate, it is possible to provide telomers having a wide variety of molecular weights so that they can be easily tailored to various specific plasticizing uses.

As catalysts which are useful in carrying out the above-described telomerizing reaction, there can be used any free-radical-forming catalyst or initiator effective for the polymerization of vinyl acetate. Particularly useful catalysts include compounds having directly linked oxygen atoms, e.g. peroxygen compounds such as diacyl peroxides, e.g. benzoyl peroxide, propionyl peroxide, and lauroyl peroxide, dialkyl and dialkylaryl peroxides such as other peroxies such as ditertiary-butyl peroxide and dicumyl peroxide, and other peroxides such as ascaridole, diethyl perdicarbonate, hydrogen peroxide, and tertiary butyl hydro-peroxide. Particularly preferred is di-tertiary-butyl peroxide. U.V. light can be used in conjunction with any compound, which photolizes under the influence of U.V. light to produce radicals; e.g. acetone. Also suitable as catalysts are azo-compound catalysts, such as disclosed in Hunt U.S. Pat. No. 2,471,959, e.g. azo-bis-iso-butyronitrile, which is commerically referred to in the art as "AZN."

The amount of catalyst employed can vary, but it is most suitably used in the amount of 0.01 to 5.0 percent by weight, calculated on the basis of the vinyl ester, preferably 0.1 to 1.0 percent by weight.

Figures 2, 3:
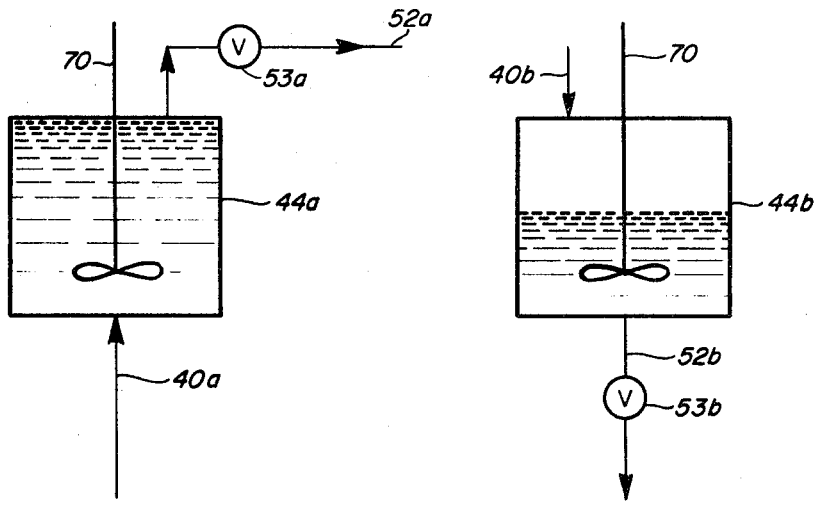

While the process can be carried out in any convenient apparatus, there are illustrated in the accompanying drawing particularly suitable apparatus systems. In the drawing, FIG. 1 is a diagrammatic view of a continuous telomer preparation and recovery train showing, in particular, apparatus for carrying out the continuous telomerization reaction;

FIG. 2 is a diagrammatic view of the modified form of continuous telomerization vessel which can be substituted for the telomerization vessel in the train of FIG. 1; and FIg. 3 is a diagrammatic view of a batch telomerization vessel for replacing the continuous telomerization vessel in the train of FIG. 1 when batch operation is desired.

Referring to the drawing, and particularly to FIG. 1, the system illustrated includes a telogen supply vessel 10 provided with an agitator 12 and inlets 14 and 16 for the telogen and the catalyst, which are suitably premixed in the vessel 10. The contents of vessel 10 are discharged through an outlet conduit 18. The taxogen, e.g. vinyl acetate, is supplied from a supply vessel 20 having an inlet 22 and an outlet conduit 24. Outlet conduits 18 and 24 are provided with pumps 26 and 28, respectively, which discharge into a common conduit 30 wherein the telogen-catalyst mixture and the taxogen are mixed in the proportions determined by the pumps 26 and 28. Conduit 30 leads to the coil 34 of a continuous coil preheater 32 which is adapted to contain a heat transfer medium, e.g. oil, for maintaining the coil 34 at the desired preheating temperature. Inlet 36 and outlet 38 are provided for circulation of the heat transfer medium through the vessel 32. The outlet end of coil 34 communicates with a conduit 40 containing a pump 42 which leads to the inlet of the coil 46 of the continuous coil reactor or telomerization unit 44, which, like the preheater 32, is adapted to contain a heat transfer medium, e.g. oil, to maintain the coil 46 at the desired reaction temperature. An inlet 48 and an outlet 50 are provided for circulation of the heat transfer medium. The outlet end of the coil 46 is connected to a conduit 52, containing a valve 53, which leads to a distillation or stripping column 54 in which the volatile components of the reaction mixture, e.g. unreacted telogen and/or taxogen are separated from the telomer, the latter being withdrawn through a line 56 and condensed in a condenser 60. The condensate from the condenser 60 is separated and recycled to the system.

Instead of a continuous coil reactor as shown at 44 in FIG. 1, good results can also be obtained with a continuous reactor of the agitator type wherein the reactants are continuously introduced into a continuously-stirred body of the reaction mixture and corresponding amounts of the reaction mixture are continuously withdrawn so that the volume of the body of the reaction mixture remains substantially constant. Such a reaction vessel is shown diagrammatically in FIG. 2, wherein parts corresponding to those shown in FIG. 1 are given the same reference numeral to which "a" has been added. As seen in FIG. 2, a reactor 44a has an inlet 40a at its bottom and an outlet 52a at its top, provided with a valve 53a. The outlet 52a is suitably arranged as shown so that the vessel 44b is always filled with liquid. The vessel 44b is suitably provided with an agitator 70 and is heated in any convenient manner (not shown) as by a jacket, strip heaters, or the like. as well known in the art.

In some cases it may be desirable to carry out telomerization in accordance with this invention in a batch-wise manner. In that event, a batch reaction vessel is suitably substituted for the reactor 44 in FIG. 1. FIG. 3 illustrates diagrammatically a typical batch reaction vessel, and in FIG. 3 parts corresponding to those shown in FIG. 1 have been given the same reference numeral to which "b" has been added. Thus, the batch reactor in FIG. 3 comprises a vessel 44b having an inlet 40b, and an outlet 52b containing a valve 53b, and is provided with a stirrer 70. Like the reactor 44a shown in FIG. 2, reactor 44 is advantageously provided with heating means (not shown). The reactors of FIGS. 2 and 3 are conveniently in the form of autoclaves.

The invention will now be described with reference to specific examples of practical application, but it will be understood that these examples are given for illustrative purposes only and are in no way limitative of the invention. In the examples all parts are by weight, unless otherwise indicated.

EXAMPLE

Using a continuous coil reactor system of the type shown in FIG. 1, a feed stock consisting of vinyl acetate and of commercial xylene in the volume ratio of 1:3 and containing 0.5 percent by volume (based on the vinyl acetate) of di-tert-butyl peroxide was continuously passed through the system. The preheater 32 was maintained at about 268°F. and the reactor temperature was maintained at about 320°F. The pumps 26, 28 and 42 were operated to provide a rate of flow of the telomerization mixture through the system of 0.2 gal./min., and the valve 53 was controlled to maintain a pressure of about 210 p.s.i.g. The reaction was continued for about 11 hours. The product was stripped in stripper 54, to remove the non-reacted liquids, and the product telomer was collected from the bottom of the stripper in a suitable receiver. At the rate of flow indicated, the residence time of the telomerization mixture was about 15 seconds in the preheater 32 and about six minutes in the reactor 44. A typical vinyl acetate-xylene telomer produced in the system and under the conditions described had a molecular weight of about 2000 and was produced with a conversion of about 62 percent.

The continuous telomerization reaction is, of course, not limited to equipment of any particular size or to any specific period of operation, and it can readily be carried out for longer periods of time and with different vinyl acetate-telogen ratios, different catalysts and quantities of catalysts, different residence times and different temperatures, all within the previously specified ranges.

As previously mentioned, telomers, broadly, can be represented by the formula $$Y(A)_n Z$$

wherein Y and Z are, as specified above, the fragments of the telogen attached to the terminal portions of the radical $(A)_n$. More specifically, the vinyl ester telomers of this invention can be represented by the formula

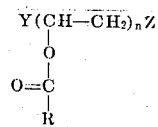

wherein R is an alkyl group, especially a lower-alkyl group, and wherein Y and Z are the fragments of the telogen, i.e. a methyl-substituted benzene containing at least two methyl substituents, e.g. xylene, mesitylene, pseudocumene, hemi-mellitene, prehnitene, isodurene, durene, pentamethylbenzene, and the like. In the case of xylene, any of the three isomers, or mixtures thereof, may be employed. Commercial xylene predominates in the meta- and para-isomers, with a lesser amount of the orthoisomer. However, pure ortho-, meta-, or para-xylene may be employed. In these formulae and in the formula previously set forth, $n$ may be 1 to 150 but is preferably at least 2, and is most suitably at least 5.

By means of the processes described above, not only can telomers be produced in which the integer $n$ in the formula can have a relatively high value, e.g. up to 150, but it is also possible to prepare telomers in which $n$, in this formula, has a much lower value. The low molecular weight telomers can be prepared, as a major product, by using appropriate conditions. These conditions comprise a high xylene to vinyl acetate ratio, i.e. at least about 5:1, and a high content of catalyst, i.e. at least about 2 percent based on the vinyl ester in the case of batch operations, and a xylene to vinyl acetate ratio of at least about 2:1 and a high catalyst content, i.e. at least about 5 percent in the case of continuous operation. Inverse conditions produce telomers having a higher value for $n$ and higher molecular weights.

The telomers of this invention which are most suitable for use with cellulose nitrate have molecular weights of 1000 to 3000.

In the use of the vinyl ester-methyl-substituted benzene telomer of this invention as a plasticizer for cellulose nitrate, the telomer-cellulose nitrate weight ratio is most conveniently 1:4 to 5:1, although lesser or greater ratios can be employed, depending upon the extent of plasticization desired. The plasticized composition may consist essentially of the cellulose nitrate and the telomer, or solvents of the type conventionally used in making cellulose nitrate compositions may also be employed particularly when the composition is to be used as a lacquer, or as a coating for film, e.g. cellophane film. Typical solvents are identified, for example, in Alling U.S. Pat. 1,945,250 and in Bader U.S. Pat. 2,895,844. Such solvents are used in amounts to give the desired fluidity to the composition for the particular intended use. Large quantities of solvents are employed when the finished composition is to be used as a lacquer or other coacting composition. Lesser amounts, e.g. 5 percent or less, or none at all, are employed when the cellulose nitrate composition is to be used for certain other purposes, such as a molding compound. It will also be understood that fillers such as clay, coloring materials of various kinds, and the like, may be incorporated in the composition to give the desired characteristics.

When plasticizing nitrocellulose with the vinyl acetate telomer, the combining of the telomer with the nitrocellulose may be effected by various techniques well understood in the art. For example, the two materials may be milled together but, particularly when the finished composition is to be used as a lacquer or other coating, the telomer is incorporated into a solution of the nitrocellulose in an appropriate solvent system of the type conventionally employed with nitrocellulose. The telomer may be free from unreacted methyl-substituted benzene, e.g. xylene, or it may contain quantities of unreacted methyl-substituted benzene which are compatible with the other components of the solvent system. The amount of xylene or other methyl-substituted benzene accompanying the telomer is, of course, regulated in the stripping step in the telomer manufacturing process.

The following example illustrated the effectiveness of a representative telomer of this invention, e.g. a vinyl acetate-xylene telomer, in the plasticization of nitrocellulose, and particularly demonstrates the low water sensitivity of the plasticized product.

Two batches of nitrocellulose were plasticized with the telomer produced in Example 1, the first plasticized composition being a 50-50 weight mixture of telomer and nitrocellulose, and the second plasticizer composition being a 67-33 weight mixture of telomer and nitrocellulose. The two plasticized compositions were dissolved in 8 parts of a 1:1 benzene/cellulose mixture to form solutions which were then cast into films, dried in a vacuum oven, and desiccated to a moisture content of less than 0.01 percent. The films were then placed in an atmosphere of 50 percent relative humidity and 23°C. and the percent pick-up of water was measured after 24 hours and after 528 hours.

For the purposes of comparison, films were prepared from corresponding compositions of nitrocellulose and a vinyl acetate-isopropanol telomer. the films were tested in identical manner for water pick-up, except that measurements were made after 24 hours and after 216 hours. The results of these comparative tests are shown in the following Table:

| Nitro-cellulose | Isopropanol Telomer | Xylene Telomer | % Weight H₂O Pickup 24 hr. | 216 hr. | 528 hr. |
|---|---|---|---|---|---|
| 100 | | | 0.1 | 1.5 | |
| 50 | 50 | | 0.3 | 3.0 | |
| 33 | 67 | | 0.3 | 3.4 | |
| 50 | | 50 | <0.01 | | <0.01 |
| 33 | | 67 | <0.01 | | <0.01 |

It will be apparent to those skilled in the art that various changes and modifications may be made in the em-

I claim:

1. A telomer of the formula

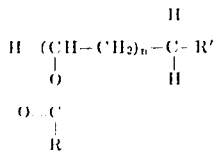

wherein R is a lower alkyl group and R' is a methyl-substituted phenyl group containing at least one methyl group attached to it and having only methyl substituents, $n$ having a value oF 5 to 150.

2. A telomer as defined in claim 1, having a molecular weight of 1000 to 3000.

3. A telomer as defined in claim 1, wherein R' is tolyl and R is methyl to provide a telomer of vinyl acetate and xylene.

* * * * *